(12) United States Patent
Graham

(10) Patent No.: US 9,173,348 B2
(45) Date of Patent: Nov. 3, 2015

(54) BALE PROCESSOR FOR BALES OF ALL SHAPES

(71) Applicant: Vermeer Manufacturing Company, Pella, IA (US)

(72) Inventor: Lucas B. Graham, New Sharon, IA (US)

(73) Assignee: Vermeer Manufacturing Company, Pella, IA (US)

( * ) Notice: Subject to any disclaimer, the term of this patent is extended or adjusted under 35 U.S.C. 154(b) by 23 days.

(21) Appl. No.: 13/749,895

(22) Filed: Jan. 25, 2013

(65) Prior Publication Data

US 2013/0193247 A1 Aug. 1, 2013

Related U.S. Application Data

(60) Provisional application No. 61/591,594, filed on Jan. 27, 2012.

(51) Int. Cl.
*A01F 29/00* (2006.01)
*A01D 87/12* (2006.01)

(52) U.S. Cl.
CPC ............... *A01F 29/005* (2013.01); *A01F 29/00* (2013.01); *A01D 2087/128* (2013.01)

(58) Field of Classification Search
CPC .... B02C 13/095; B02C 13/28; B02C 13/282; B02C 13/2804; A01F 29/005; A01F 29/00; A01F 29/10; Y10S 241/605
USPC ............ 241/605, 189.1, 186.2, 186.35, 285.3
See application file for complete search history.

(56) References Cited

U.S. PATENT DOCUMENTS

| | | | |
|---|---|---|---|
| 4,082,198 A * | 4/1978 | Anderson et al. ............. | 414/502 |
| 4,411,573 A * | 10/1983 | Townsend .................... | 414/24.6 |
| 4,524,916 A | 6/1985 | Keyes | |
| 4,846,411 A * | 7/1989 | Herron et al. .......... | 241/101.761 |
| 6,109,552 A * | 8/2000 | Strankman ............... | 241/101.72 |
| 6,578,784 B1 | 6/2003 | Lischynski et al. | |
| 6,708,911 B2 | 3/2004 | Patterson et al. | |
| 6,711,824 B2 | 3/2004 | Hruska | |
| 6,886,763 B2 | 5/2005 | Lepage et al. | |
| 7,581,691 B2 | 9/2009 | Helmeczi et al. | |
| 8,066,208 B2 * | 11/2011 | Bennett .......................... | 241/30 |
| 8,146,844 B2 * | 4/2012 | Kisenwether .................. | 241/60 |
| 8,528,843 B2 * | 9/2013 | Murphy ......................... | 241/30 |
| 2001/0008259 A1 * | 7/2001 | Hruska ...................... | 241/189.1 |
| 2005/0205706 A1 | 9/2005 | Lepage | |
| 2006/0086857 A1 | 4/2006 | Lepage et al. | |

FOREIGN PATENT DOCUMENTS

CA 2246465 11/2000

OTHER PUBLICATIONS 2 pages, of a Brandt Bale Commander VSF-X.

(Continued)

*Primary Examiner* — Faye Francis
(74) *Attorney, Agent, or Firm* — Sturm & Fix LLP

(57) ABSTRACT

A bale processor (10) of a type that efficiently processes both round and square bales. A bale processor chamber (12) has at least one moveable wall (12*b*) adjustable between a mostly vertical position suitable to process round bales and at least one less vertical position suitable to process square bales. A floor conveyor (16) is provided at the bottom of the bale processor chamber (12) and is oriented at an angle of eight to sixteen degrees from horizontal to move a bale and bale parts toward a rotor (14) which tears the bale into smaller pieces and throws the smaller pieces out of the bale processor (10).

10 Claims, 6 Drawing Sheets

(56) References Cited

OTHER PUBLICATIONS 11 pages of International Search Report and Written Opinion from International Application No. PCT/US2013/023153—corresponding application.

8 pages of a Notification Concerning Transmittal of International Preliminary Report on Patentability (Chapter 1 of the PCT) and International Preliminary Report on Patentability from International Application No. PCT/US2013/023153—corresponding application.

* cited by examiner

BALE PROCESSOR FOR BALES OF ALL SHAPES

TECHNICAL FIELD

This invention relates generally to bale processors and more particularly to a bale processor for processing bales of all shapes.

BACKGROUND

Bale processors are devices used to spread the content of bales of forage in a controlled way for reasons such as mulching or feeding livestock. Examples of bale processors are shown in application PCT/US2011/058514, filed Oct. 31, 2011, to Graham et al., U.S. Pat. No. 6,708,911 to Patterson et al., U.S. Pat. No. 6,711,824 to Hruska, U.S. Pat. No. 6,578,784 to Lischynski et al., U.S. Pat. No. 6,886,763 to Lepage et al., U.S. Pat. No. 7,581,691 to Helmeczi et al. and Published U.S. Patent Application No. 2006/0086857 to Lepage et al., all of which are incorporated herein by reference in their entirety.

One of the most popular configurations of bale processors includes a processing tub, that holds the bale while it is being processed, mounted to a frame with a hitch on the front, and a bale lift device at the back. The processing tub includes a conveyor located at the bottom, adjacent a rotor. The conveyor is configured move the round bale so that a portion of the bale comes into contact with the rotor. A portion of the bale also comes in contact with a side of the tub, a generally planar side panel that is positioned in a generally vertical orientation, adjacent to the rotor. These three devices, the conveyor, the rotor and the first side panel, work together to cause the round bale to rotate about its axis while the rotor cuts or tears a layer of material off the bale. The tubs generally include a second side panel, on the side of the machine opposite the first side panel, so that the conveyor can move the bale in either direction, so that the bale can be forced to rotate either clockwise or counter-clockwise. The bale lift device is positioned to place the bale approximately in the center of the tub, between the two side panels.

These aforementioned bale processors were developed specifically to process round bales and they are not effective in processing large square bales (i.e. bales that are square or rectangular in cross section).

One company, Brandt, developed and marketed a bale processor a brochure of which is cited in the invention disclosure statement of the instant patent file. The Brant bale processor, model VSF-X, was advertised by Brant as being able to process both large square bales and large round bales that included a conveyor at the bottom of its tub oriented at a 4.5 degree slope. This Brandt machine had a square bale kit that added the capability that the second side of the tub could be repositioned into a generally horizontal orientation, with an upper surface generally aligned with the upper surface of the conveyor. The combination of the conveyor and the side panel in the horizontal position defined a feed deck. This feed deck supported a large square bale, with about one half of the bale on the side panel and the other half on the conveyor, it being surmised that the feed conveyor was used to move the bale towards the rotor. The side panel of this product was positioned with a hydraulic cylinder, in either (1) a raised position for processing round bales, or (2) in a lowered position for processing square bales.

The Brandt bale lift device was modified for the square bale kit, to include bale forks that would pick-up and load a square bale off-set from the original center of the tub, the center of the side panels when both are in a vertical position, to place the bale on the feed deck, with approximately half of the bale supported by the second side panel when in the horizontal orientation.

Accordingly, a bale processor that will efficiently process both round and square bales is needed.

BRIEF DESCRIPTION OF THE DRAWINGS

The above needs are at least partially met through provision of the method and apparatus described in the following detailed description, particularly when studied in conjunction with the drawings, wherein.

Figure 1:
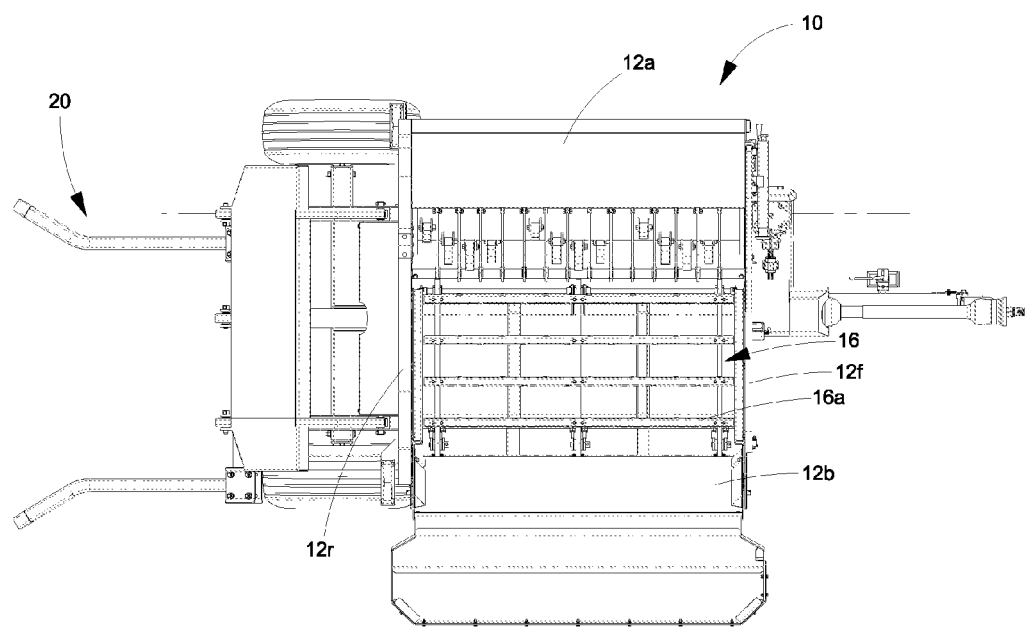
FIG. 1 is a top plan view of a preferred embodiment of the bale processor of the present invention with a moveable side wall in a position ideal for processing round bales.
Figure 2:
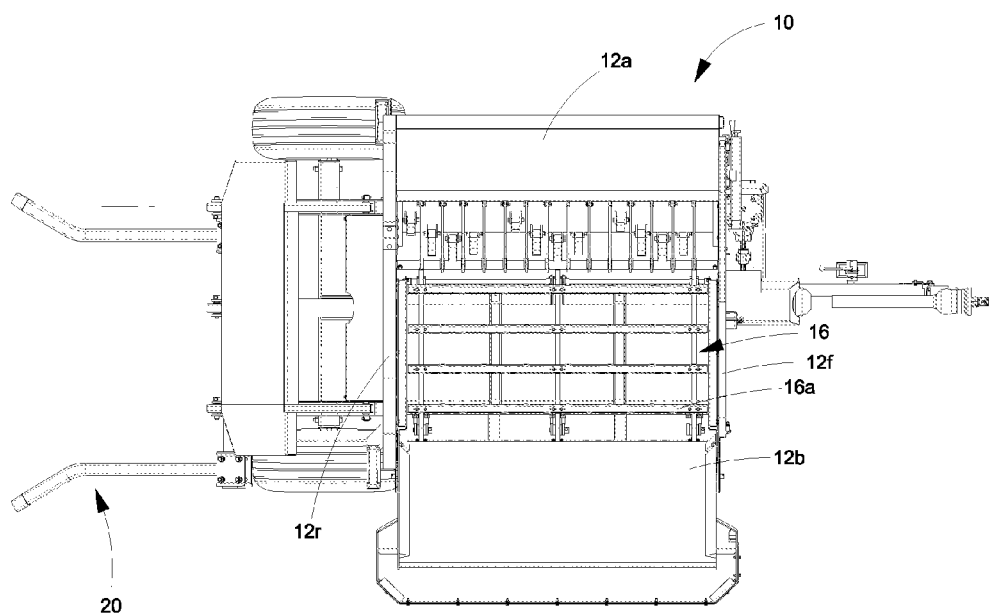
FIG. 2 is a top plan view of a preferred embodiment of the bale processor of the present invention like FIG. 1, but with a moveable side wall in a position for processing square bales.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-6 show a bale processor 10 constructed in accordance with a preferred embodiment of the invention.

Figure 3:
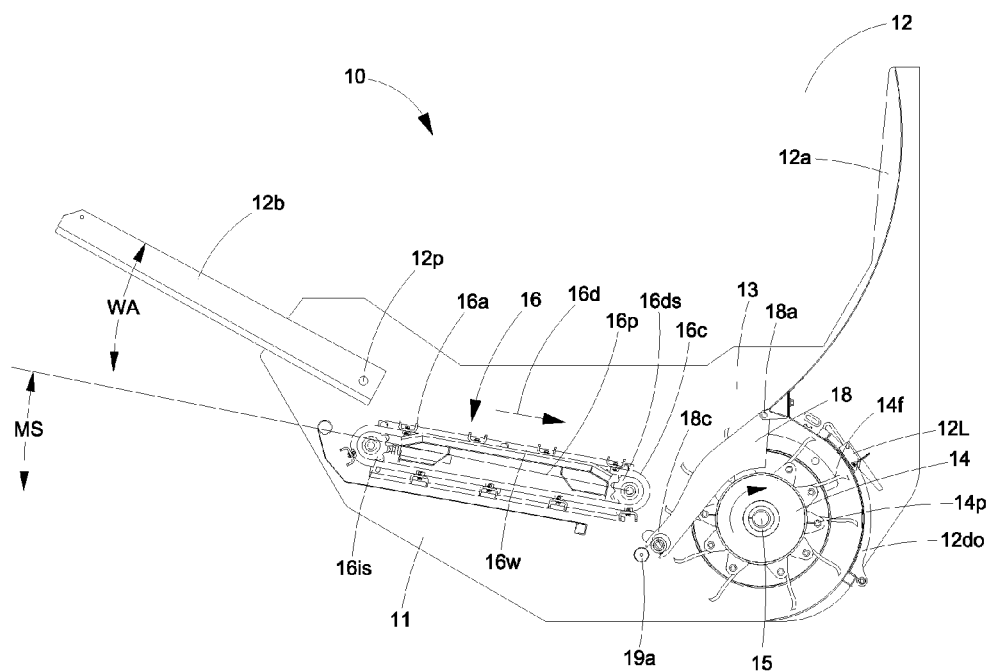
FIG. 3 is a front elevational schematic view with the front sheet metal panel of the hopper removed to show the working parts inside and showing the moveable side wall in a position for processing square bales.

The bale processor 10 has a frame 11 as shown in FIG. 3, connecting a hopper 12 to the frame 11 for receiving a bale (not shown) to be processed. The hopper 12 has two side walls 12a/12b and two end walls, 12f/12r arranged to define an open top through which the bale is loaded. The two side walls 12a/12b converge inwardly and downwardly to a lower disintegration area 13.

A flail rotor 14 is mounted in the disintegration area 13 and is rotatable about an axis 15, extending generally along the side wall 12a and transverse to the end walls 12f/12r. The flails 14 are preferably flails like those shown with the outer cutting edge leading the rest of the flail when it rotates because this type of flail tends to throw the material, which action is desired in a bale processor. The rotor 14 and flails 14f can be like those disclosed in U.S. Pat. No. 7,581,691, column 1, starting at line 45. An example of such a typical flail disintegrator for a bale processor is illustrated in FIGS. 1-24 and is also described in U.S. Pat. No. 6,109,553 to Hruska, which is incorporated herein by reference.

One end of each flail 14f is welded to a hollow cylindrical section for pivotally mounting by a bolt to a support or tab that is welded to the rotor 14. The other, radially outer, end of flail is beveled to provide a cutting or tearing edge.

Figure 4:
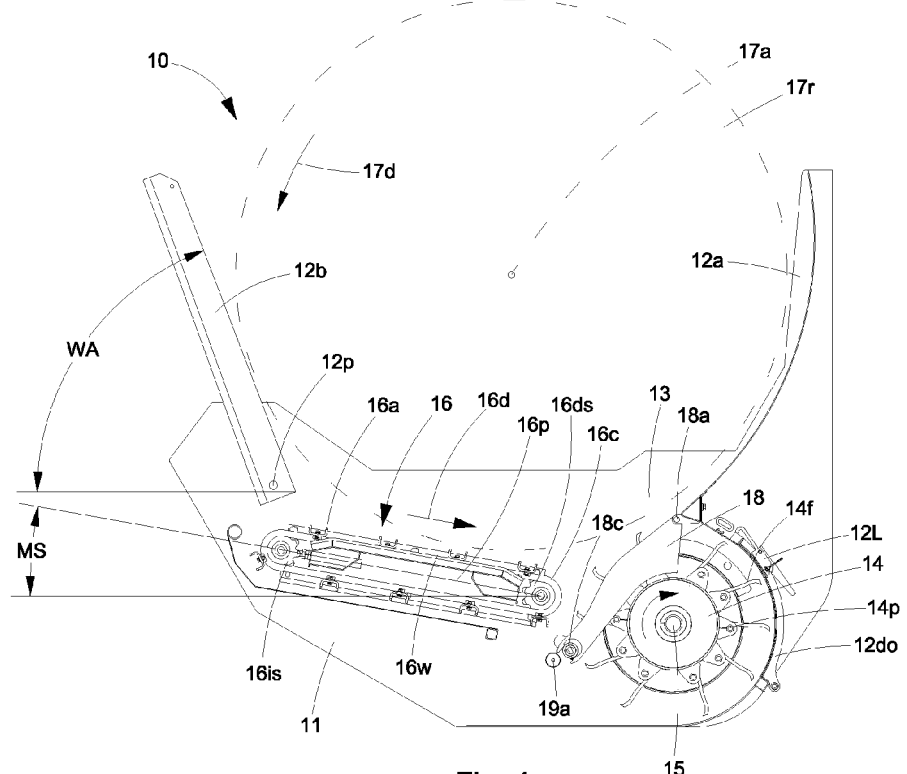
FIG. 4 is a front elevational schematic view with the front sheet metal panel of the hopper removed to show the working parts inside and showing the moveable side wall in a position for processing round bales.

FIG. 4 shows a portion of a chain conveyor 16 positioned in the hopper 12 to rotate a round bale 17r around an axis 17a that is generally parallel to the flail rotor axis 15. Chain conveyor 16 is powered by hydrostatically powered drive sprocket 16ds and idler sprocket 16is that are positioned outside and below the hopper 12. Drive members 16a, supported by plate 16p and wear strips 16w, and attached to chains 16c, engage the bale 17, at the bottom of the hopper 12. Movement of the drive members 16a in the direction of arrow 16d result in rotation of the bale in direction 17d. The flail rotor 14 rotates in a direction 14d. The direction of movement of chain conveyor 16 can be reversed as may be required to accommodate variations in bale shape. Wear strips 16w are supported on metal formed in channels 16p disposed at the bottom of the hopper 12.

The flail rotor 14 provides an outer support surface with a plurality of flails 14f pivotally mounted thereon along axes 14p for movement therewith around the flail rotor axis 15 for engaging the bale 17 and removing material from the outside thereof due to the flails 14f above the spacer bars 18 coming in contact with the outer part of the bale 17. Some of the flails 14f are spaced apart along the flail rotor axis 15. The rotor 14 is like U.S. Pat. No. 7,581,691 to Helmeczi et al., and the flails 14f are preferably cup shaped like those shown in U.S. Pat. No. 7,581,691 to Helmeczi et al., which has been incorporated herein by reference in its entirety.

One of the side walls 12a has the rotor access door 12do at the disintegration area 13 for discharge of the material removed from the bale 17 by the flail rotor flails 14f from the disintegration area 13. 12do is a rotor access door which must be closed during machine operation. It is used to perform rotor inspection and maintenance. The rotor access door 12do can optionally be held closed with latches 12L when the bale processor 10 is in use and opened for maintenance and inspection when the bale processor not in use.

A plurality of depth control bars, called slugbars, 18 are pivotally attached at the top end by bolts 18a, the depth control bars 18 being disposed between adjacent flails 14f for controlling the distance that a radially outer end of the flails 14f extend into the outer surface of the bale 17.

Referring to FIG. 3, it is noted that a minimum slope MS of 8 degrees of the conveyor 16 from horizontal is required to consistently cause round bales to rotate while being processed.

Using a floor conveyor 16 positioned at that angle of more than eight (8) degrees also allows processing of square bales 17s (FIGS. 5 and 6) when the position the second side panel 12b is at a wall angle WA about pivot point 12p, steep enough to guarantee that when the bale 17s falls apart, after the twines are cut, the loose material will slide off the side panel 12b and onto the floor conveyor 16. The combination of a floor conveyor 16 at a slope of between 8 and 15 degrees from horizontal with the side panel 12b at a slope of at least 20 degrees from horizontal, is able to reliably process large square bales.

Figure 5:
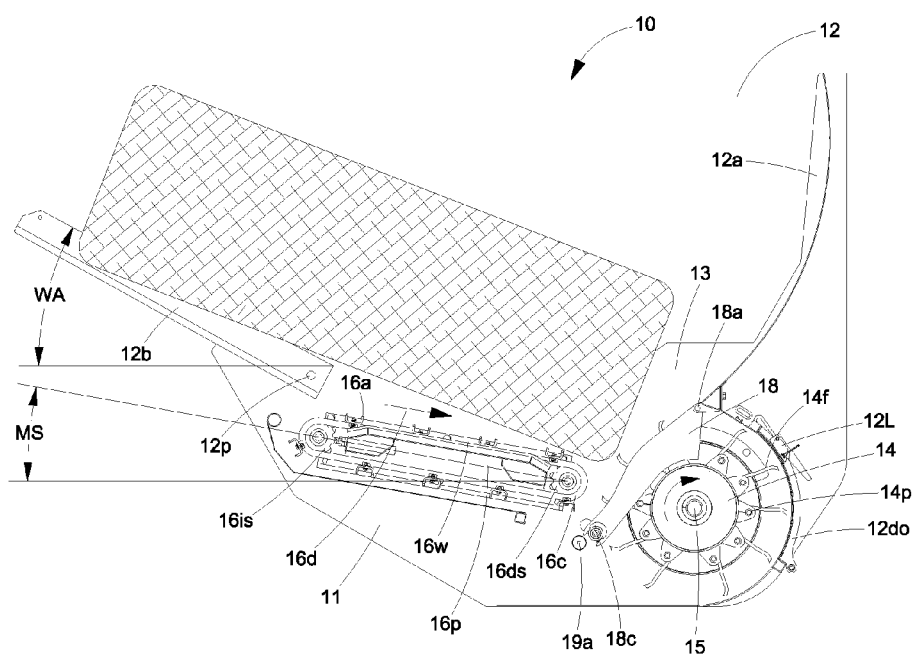
FIG. 5 is a front elevational schematic view with the front sheet metal panel of the hopper removed to show the working parts inside and showing the moveable side wall in a first position for processing square bales and showing a square bale being processed.
Figure 6:
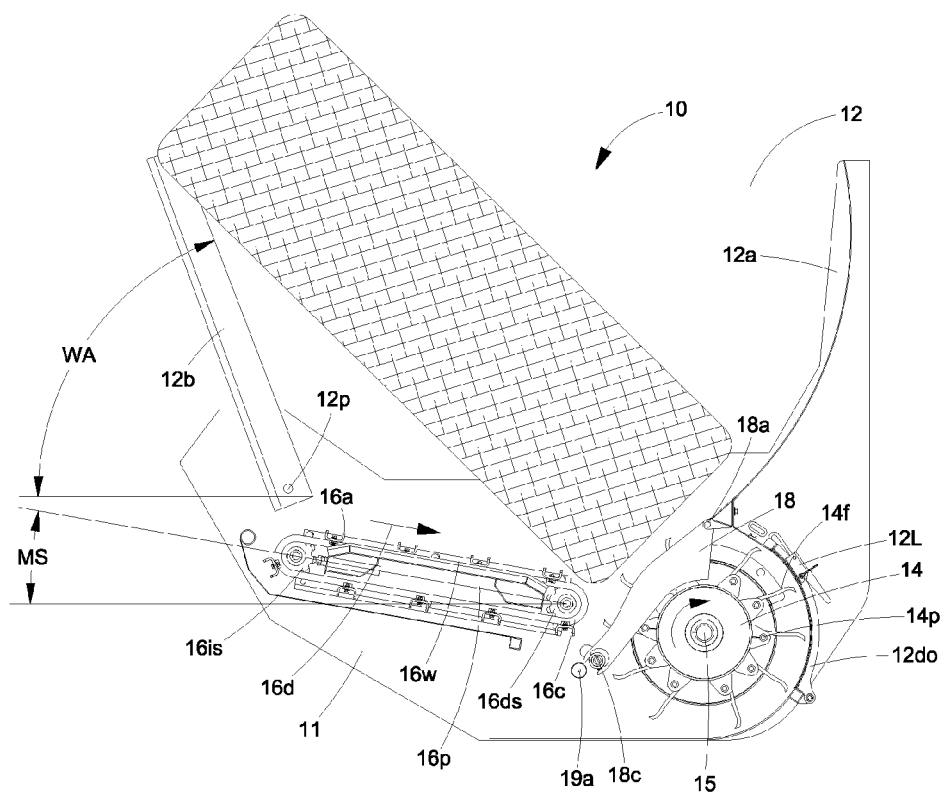
FIG. 6 is a front elevational schematic view with the front sheet metal panel of the hopper removed to show the working parts inside and showing the moveable side wall in a second position for processing square bales and showing a square bale being processed.

Looking to FIGS. 5 and 6, once a square bale 17s is loaded in the processing area 12, the floor conveyor 16 can move one corner of the bale 17s into contact with the rotor flails 14f of rotor 14. Once the rotor 14 securely contacts the bale 17s, and a sufficient amount of material is removed from the bale 17s to expose the twine (not shown), the rotor 14 cuts the twines and the bale 17s will fall apart. Approximately half of the bale 17s is then supported by the floor conveyor 16 and can reliably be moved into contact with the rotor 14 and against the first side panel 12a by the conveyor 16. The other half of the bale 17s will be supported by the second side panel 12b. With the second side panel 12b in an angled position as shown in FIG. 5 or 6, the material of bale 17s will slide down the second side panel 12b and in to contact with the conveyor 16. The angled position of second side panel 12b also results in an enlarged space between the first and second side panels 12a/12b to allow an eight foot long square bale to be loaded. It is to be understood that FIGS. 5 and 6 show the extreme pivoted positions of the wall 12b for use with square bales 17s, but that the wall 12b could be positioned anywhere between the FIG. 5 and FIG. 6 position for processing square bales 17s.

The operation of the present invention can be summarized as follows:

(1) Position the floor conveyor 16 at an angle of at least 8 degrees, as measured from horizontal, to assure consistent operation when processing round bales 17r. When configured for processing round bales 17r both the first and second side panels 12a/12b are mostly vertical as shown in FIG. 4 and the bale lift device 20 (FIGS. 1 and 2) places a bale 17r in the center, as defined as the middle of the space between the side panels 12a/12b.

(2) For processing a square bale 17s, reposition the second side panel 12b to an alternate position shown in or between that shown in FIGS. 5 and 6, angled at least 20 degrees as measured from the horizontal plane, to widen the tub between walls 12a and 12b to receive a square bale 17s.

(3) With the second side panel 12b in this alternate position of FIG. 5 or 6, or a position between the positions shown in FIGS. 5 and 6, a portion of a square bale 17s that is loaded into the processing tub, in any position that the bale can take within the tub, will be in contact with the floor conveyor 16 with enough contact area that the floor conveyor 16 is capable of moving the bale 17s in either direction, towards the rotor 14 and the first side panel 12a, or towards the second side panel 12b.

(4) When the rotor 14 is rotated to process the bale 17s, the floor conveyor 16 can move the bale 17s into contact with the rotor 14, oscillating it back and forth if required, until the rotor 14 cuts into the bale 17s far enough to cut through the twines. Once the twines are cut, the bale 17s will fall apart, and onto the floor conveyor 16.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

The invention claimed is:

1. A bale processor comprising:
    a cylindrical rotor having a longitudinal axis;
    a first generally planar side member positioned adjacent the rotor, parallel to the longitudinal axis of the rotor, and positioned generally vertically;
    a sloped floor conveyor comprising:
        a first roller positioned adjacent the rotor, parallel to the longitudinal axis of the rotor, spaced from the first side member;
        a second roller spaced horizontally and vertically from the first roller defining a slope of between eight (8) degrees and sixteen (16) degrees from horizontal; and
        a second generally planar side member positioned with a first side adjacent the second roller of the floor conveyor, the rotor being closer to the first generally planar side member than to the second generally planar side member;
        wherein the second side member can be positioned in two orientations:
            a first orientation being generally vertical; and
            a second orientation being sloped a minimum of 20 degrees from horizontal.

2. The bale processor of claim 1 wherein the floor conveyor further comprises a substantially straight bale support structure extending from adjacent the first roller to adjacent the second roller.

3. The bale processor of claim 1 further comprising a bale loader configured to load square bales off-center and round bales centered.

4. A bale processor comprising:
    a cylindrical rotor having a longitudinal axis;
    a first generally planar side member positioned adjacent the rotor, parallel to the longitudinal axis of the rotor, and positioned generally vertically;
    a sloped floor conveyor comprising:
        a first roller positioned adjacent the rotor, parallel to the longitudinal axis of the rotor, spaced from the first side member;
        a second roller spaced horizontally and vertically from the first roller defining a slope of between eight (8) degrees and sixteen (16) degrees from horizontal; and
    a second generally planar side member positioned with a first side adjacent the second roller of the floor conveyor, the rotor being closer to the first generally planar side member than to the second generally planar side member;
    wherein the second side member can be positioned in two orientations:
        a first orientation being generally vertical for processing round bales; and
        a second orientation being sloped a minimum of 20 degrees from horizontal for processing square bales.

5. The bale processor of claim 1 wherein the second side member is further configured to be positioned within the range between the first orientation and the second orientation.

6. The bale processor of claim 4 wherein the second side member is further configured to be positioned within the range between the first orientation and the second orientation.

7. The bale processor of claim 4 wherein the floor conveyor further comprises a substantially straight bale support structure extending from adjacent the first roller to adjacent the second roller.

8. The bale processor of claim 4 further comprising a bale loader configured to load square bales off-center and round bales centered.

9. The bale processor of claim 1 wherein the first side wall is fixed with respect to the longitudinal axis of the rotor and the second side wall is pivotable with respect to the longitudinal axis of the rotor.

10. A bale processor comprising:
    a cylindrical rotor having a longitudinal axis;
    a first generally planar stationary side member positioned adjacent the rotor, parallel to the longitudinal axis of the rotor, and positioned generally vertically;
    a sloped floor conveyor comprising:
        a first roller positioned adjacent the rotor, parallel to the longitudinal axis of the rotor, spaced from the first side member;
        a second roller spaced horizontally and vertically from the first roller defining a slope of between eight (8) degrees and sixteen (16) degrees from horizontal, at least a portion of the sloped floor conveyor being disposed between the rotor and the second pivotable side member and at least a portion of the rotor being disposed below an area between at least a portion of the floor conveyor and a portion of the first stationary side member; and
    a second generally planar pivotable side member positioned with a first side adjacent the second roller of the floor conveyor, the rotor being closer to the first generally planar stationary side member than to the second generally planar pivotable side member;
    wherein the second side member is pivotable between:
        a first temporarily fixed generally vertical position for processing round bales; and
        a second temporarily fixed position which is sloped a minimum of 20 degrees from horizontal for loading and processing square bales.

* * * * *